Fig. 2

United States Patent Office 3,280,655
Patented Oct. 25, 1966

3,280,655
HYDROKINETIC POWER TRANSMISSION MECHANISM HAVING PLURAL TURBINES AND TWO SIMPLE PLANETARY GEAR SETS
Vladimir Joseph Jandasek, Dearborn, Mich., assignor to Ford Motor Company, Dearborn, Mich., a corporation of Delaware
Filed July 18, 1963, Ser. No. 295,946
18 Claims. (Cl. 74—677)

My invention relates generally to power transmission mechanisms capable of being used in an automotive vehicle driveline, and more particularly to a multiple speed ratio power transmission mechanism having a multiple turbine hydrokinetic unit and two simple planetary gear sets wherein provision is made for rendering the turbines selectively operable to accomplish speed ratio changes.

The provision of a power transmission mechanism of the type above set forth being a principal object of my invention, it is a further object of my invention to provide a hydrokinetic unit having a pair of torus circuits, each circuit including a common impeller and a separate turbine situated in fluid flow relationship. The unit includes a flow director for interrupting the torus flow through each circuit selectively so that the turbines can be conditioned selectively for torque delivery.

It is a further object of my invention to provide a power transmission mechanism having a hydrokinetic unit of the type above set forth and two simple planetary gear units to provide three forward driving speed ratios and a single reverse speed ratio. According to one embodiment of my invention, speed ratio shifts from one ratio to another can be accomplished in a non-synchronous fashion through the medium of the hydrokinetic unit.

It is a further object of my invention to provide a hydrokinetic power transmission mechanism having a torque converter with two turbines wherein provision is made for removing one turbine from the hydrokinetic circuit while the other functions to deliver torque and wherein the geometry of each turbine can be chosen to provide optimum performance during operation in separate speed ratio ranges.

Other features and objects of my invention will become apparent from the following description and from the accompanying drawings wherein.

Figures 1, 3:
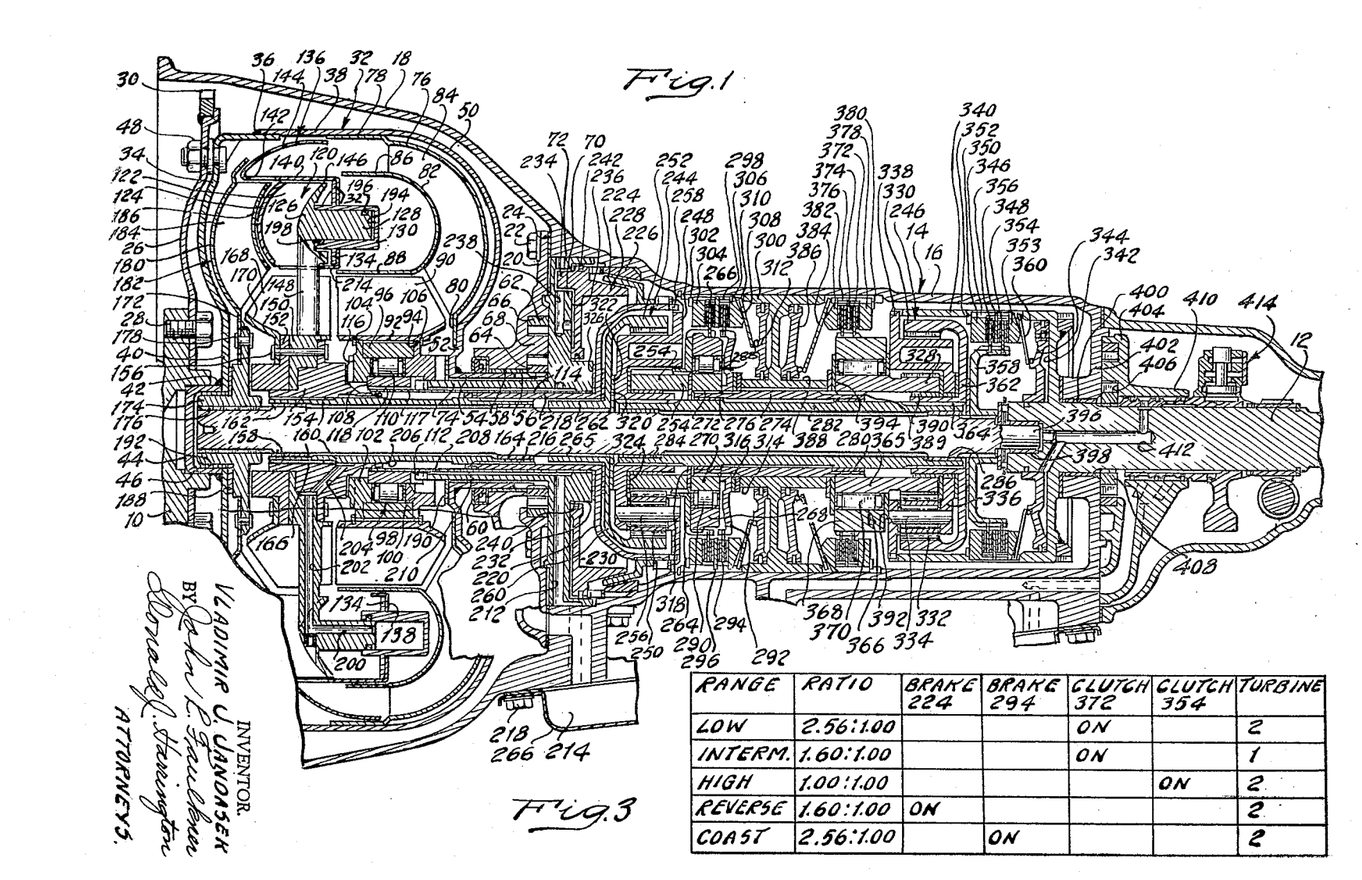
FIGURES 1 and 2 show in cross sectional form a transmission assembly embodying improvements of my invention.
FIGURE 3 is a chart showing the speed ratio change pattern for the mechanism of FIGURES 1 and 2.
Figure 2:
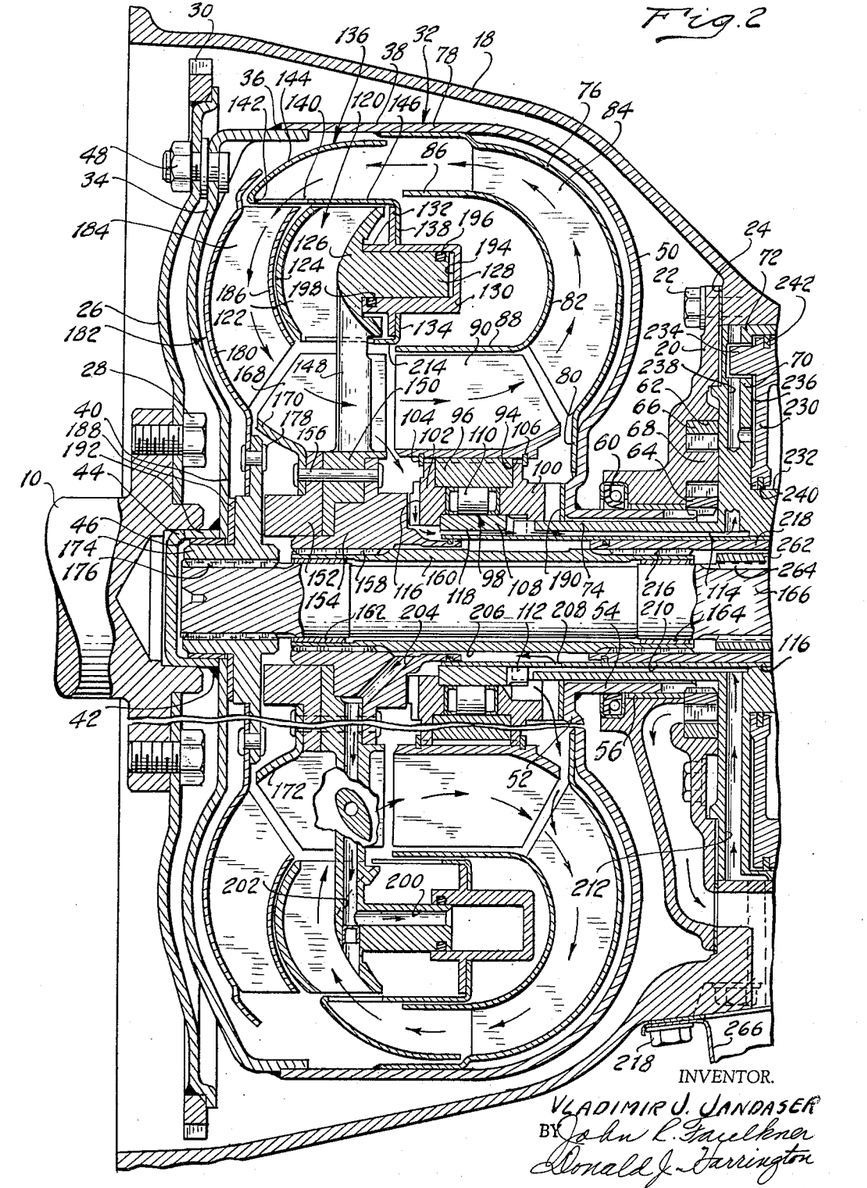

Referring first to FIGURES 1 and 2, numeral 10 designates generally a portion of an internal combustion engine crankshaft for a wheeled automotive vehicle. The driven shaft for the mechanism, which is shown at 12, may be connected through a suitable drive line to the vehicle traction wheels.

A transmission housing is generally indicated by reference character 14. It includes a reduced diameter portion 16 and a bell housing portion 18, the latter enclosing the hydrokinetic portion of the mechanism and the former enclosing transmission clutch and brake structure and the two planetary gear units.

By preference, the housing portions 16 and 18 are formed as an integral casting. At the juncture of the housing portions 16 and 18 is a wall 20 which is bolted by bolts 22 to a shoulder 24 formed in the interior of the housing. This wall separates the interior of housing portion 18 from the interior of housing portion 16.

A drive plate 26 is bolted by means of bolts 28 to a flange formed on the crankshaft 10. A starter ring gear 30 for the internal combustion enginne is carried by the periphery of drive plate 26.

An impeller shell is shown at 32. It includes a shell part 34 which is welded at 36 to the periphery of a second shell part 38. Shell part 34 extends radially inwardly, and its hub portion 40 is welded at 42 to a pilot element 44. This element 44 is received within a pilot opening 46 formed in the crankshaft 10.

Shell part 34 is secured by means of bolts 48 to the drive plate 26. Shell part 38 includes a torus shaped portion 50 which conforms in shape to the impeller blades. The hub 52 of the shell part 38 is secured by welding to a sleeve shaft 54 which is journalled by means of a bushing 56 within opening 58 formed in the wall 20. A suitable seal 60 is disposed between the wall 29 and the shaft 54.

Wall 20 defines a pump chamber 62 within which are situated pump gears 64 and 66. These are situated in meshing engagement, and a crescent portion 68 is disposed between the space that exists between the external teeth of gear 64 and the internal teeth of gear 66.

A stationary cover plate 70 is secured to the right hand side of the wall 20 to provide a closure for the pump chamber 62. It is secured at its periphery 72 to an internal surface of the housing portion 16. Plate 70 is formed with a stationary sleeve shaft 74 which extends concentrically through shaft 54.

An outer impeller shroud 76 is secured at its outer periphery 78 to the inner surface of the shell part 38. The inner periphery 80 of the shroud 76 is spot welded or otherwise secured to the hub 52 of the shell part 38. An inner impeller shroud 82 is secured to the inner margin of impeller blades 84. The shrouds 76 and 82 cooperate with blades 84 to form radial outflow passages for the fluid of the hydrokinetic unit.

The inner shroud 82 includes an axially extending portion 86 at its outer margin. In a similar fashion, the shroud 82 includes an axially extending portion 88 at its inner margin. Portions 86 and 88 define extensions of the flow passages of the impeller.

Disposed within the shroud portion 88 are stator blades 90 situated in angularly spaced relationship with respect to a hub 92. The hub 92 is formed with an internally splined opening 94 within which is situated an externally splined outer race 96 for an overrunning brake identified generally by reference character 98. Situated on either axial side of the brake 98 are spacer members 100 and 102. These members 100 and 102, together with race 96, are held axially fast by means of snap rings 104 and 106. The blades 90 are situated at the flow entrance region of the impeller blades 84 and function to alter the magnitude of the tangential component of the absolute fluid flow velocity vector at this region of the torus circuit.

An inner race for the overrunning brake 98 is shown at 108. Disposed between the races 96 and 108 is a series of overrunning brake elements in the form of rollers or sprags. These are shown at 110, and they cooperate with the races to establish a braking action for the stator blades in one direction but permit freewheeling motion thereof in the opposite direction. If rollers are used, race 96 can be cammed to establish camming action with the elements 110.

Race 108 is keyed at 112 to the stationary sleeve shaft 74. A flow passage 114 formed within the sleeve shaft 74 is defined in part by means of a sleeve 117 received within the shaft 74. It communicates with the interior of the torus circuit through radial passages 116 formed in spacer 102. A portion of the passage 114 is defined also by a recess 118 formed within race 108.

A first turbine is indicated generally by reference character 120. It includes blades 122 which are secured to an outer shroud 124 and an inner shroud 126. The blades 122 cooperate with the shrouds to define radial inflow passages. Shroud 126 is formed with an annular extension 128 which is received within an annular cylinder 130. This cylinder is formed with radial flanges 132 and 134. Secured to the cylinder 130 is a flow directing baffle 136 which is formed with a radially extending portion 138 secured to the flanges 132 and 134. It includes also an annular drum portion 140 which is provided with an aperture 142. This aperture is adapted to form a continuation of the torus circuit, as will be explained subsequently.

The fluid flow directing baffle 136 includes also an outer shroud portion 144 which defines the outer limits of a portion of the torus circuit for the hydrokinetic unit.

The flow passages of which turbine blades 122 form a part are blocked by a baffle portion 146. When the baffle assumes the left position portion 146 is situated over the entrance region of the blades 122.

The blades 122 are supported upon radial spokes 148 which extend through the inner portion of the torus circuit. The spokes can be formed with an aerodynamic cross section, as indicated in FIGURE 2 to provide minimum resistance to the torus flow. Spokes 148 are connected to a hub 150 which in turn is secured to turbine hub portions 152 and 154. These portions 152 and 154 are riveted together for point rotation by rivets 156. Portion 154 is internally splined at 158 to a turbine sleeve shaft 160. This shaft in turn is supported by means of bushings 162 and 164 to a central turbine shaft 166.

Hub portion 152 has secured thereto a series of circumferentially spaced flow directing blades 168 situated at the flow exit region of the blades 122. These blades are formed upon a shroud 170 which has a hub portion thereof connected to the hub portion 152, as shown at 172. The blades 168 direct the flow of fluid passing through the blades 122 to the entrance region of the stator blades 90.

Another turbine hub 174 is splined at 176 to the shaft 166. Hub 174 is riveted by means of rivets 178 to an outer shroud 180 of a second turbine identified generally by reference character 182. Connected to the shroud 180 is a series of circumferentially spaced turbine blades 184. Secured to the inner periphery of the blades 184 is an inner shroud 186. The shrouds 180 and 186 and the blades 184 cooperate to define radial in-flow passages that are situated in parallel relationship with respect to the passages defined by the blades 122 of the first turbine 120. The flow exit region of the passages for blades 184 are situated adjacent the flow entrance region of the flow directing blades 168 which in turn transfer the torus flow to the entrance section of the stator blades 90.

When the flow directing baffle 136 assumes the left position, the aperture 142 form a part of the torus flow passages for the blades 184. Thus a continuous torus flow circuit is provided, such circuit including the impeller passages, the stator passages and the passages of turbine 182. The passages of turbine 120 under these conditions form no part of the flow circuit.

A thrust washer 188 is situated between the hub 174 and the hub 40 for the shell part 34. Another thrust washer 190 is situated between the spacer 100 and the hub 52 of the shell part 38. Hub 174 is journaled by means of a bushing 192 within the pilot element 144.

The annular extension 128 and the cylinder 130 cooperate to define a pressure cavity 194. This cavity is sealed by a circular sealing ring 196 formed in a sealing ring groove in the piston 128. A corresponding circular sealing ring 198 is disposed in a sealing ring groove in cylinder 130.

Fluid pressure can be admitted into the chamber 194 through a passage 200 formed in the piston 128. This passage 200 communicates with a radial passage 202 formed in one of the spokes 148.

The radially inward portion of passage 202 communicates with a transversely extending passage 204 formed in hub portion 154. This communicates in turn with an annular passage 206 defined by a concentric sleeve shaft 160 and the flow directing sleeve 116. Sleeve 116 is formed with an opening 208 which communicates with an axially extending groove 210 formed in the stationary sleeve shaft 74. Groove 210 in turn communicates with a radial passage 212 which communicates with a control valve body situated in the lower region of the housing portion 16. This lower region defines a sump identified generally by reference character 214. The sump includes an oil pan 216 secured by bolts 218 to the lower side of the housing portion 16.

Passage 212 is formed by the closure plate 70. As fluid pressure is admitted to the passage 212, it is distributed to the working chamber 194. This causes cylinder 130 to shift in a right hand direction, as viewed in the drawings, within the inner torus region defined by the shroud 82. Thus the flow directing baffle 136 will be shifted in a right hand direction, as viewed in the drawings, to cause apertures 142 to register with the inlet flow sections of the blades 122 for the first turbine 120. This causes the flow passages for the turbine 120 to become a part of the torus flow circuit while the flow passages for the turbine 182 are isolated from the circuit. Thus a turbine torque is developed by the blades 122 and this torque is distributed to the turbine sleeve shaft 160. No turbine torque is distributed to the central turbine shaft 166.

The baffle 136 includes also an extension 214 which blocks the flow exit region of the blades 122 when it assumes a left hand position as shown in the drawings. On the other hand, when the baffle 136 is shifted in the right hand direction, portion 212 is received within the inner torus region of the shroud 82 thereby allowing fluid to pass freely from the passages of blades 122 through the blades 168.

When the baffle 136 is shifted in a left hand direction, turbine 120 is incapable of developing turbine torque and all of the torque that is developed by the hydrokinetic unit is distributed from the turbine 182 to the central turbine shaft 166.

To accomplish a shifting movement of the baffle in a left hand direction, it merely is necessary to exhaust the pressure from chamber 194. The circuit pressure that normally exists in the hydrokinetic circuit thus urges the baffle 136 and the cylinder 130 in the left hand direction.

I contemplate that the turbine 182 can be rendered operative during operation of the hydrokinetic unit in the low speed ratio range. Its geometry thus can be made favorable for hight torus flow, low speed operating conditions. I contemplate also that the baffle 136 will be shifted when the speed ratio is in the intermediate range so that the turbine 120 will be functional during operation in the high speed ratio portion of the torque conversion range. Its design than can be tailored to provide optimum geometry for these conditions.

During cruising, I contemplate that the baffle 136 will be shifted in a left hand direction thereby rendering the turbine 182 operable again. The length of the blades of the turbine 182 is greater than the length of the blades 122, and for this reason the coupling characteristics for the turbine 182 are more favorable.

Tubine shaft 160 is splined at 216 to a sleeve shaft 218. This shaft in turn is integrally formed with a radially extending portion 220 which is keyed or splined to a brake disc member 224. The outer surface of member 224 is surrounded by a conical brake element 226 that is secured permanently to a cooperating internal shoulder formed in the housing portion 16. The inner surface of the element 224 is situated in close proximity to an annular friction cone element 228 by a fluid pressure operated piston 230. This piston is annular in form and is received within a cooperating annular cylinder 232 formed in the plate 72. A pilot extension 234 is received within a cooperating pilot opening formed in the plate 72.

Fluid pressure can be admitted to the fluid chamber 236 defined by the cylinder 232 and the piston 230 through a fluid pressure distributor passage 238. The inner margin of the piston 230 is sealed at 240 and the outer margin is sealed at 242.

When fluid pressure is admitted to the chamber 236 cone disc brake element 224 is held fast by reason of the frictional contact established with the element 226 and the element 228.

A first planetary gear unit is indicated generally by reference character 244 and a second planetary gear unit is identified generally by reference character 246. Unit 244 includes a carrier 248 upon which are journalled three planet pinion gears 250. These gears engage a ring gear 252 and a sun gear 254. Carrier 248 includes planet pinion shafts 256 which provide needed support for the pinions 250.

Carrier 248 is keyed at 258 to a radially extending portion 220 on the shaft 218. Ring gear 252 is connected by means of a radially extending portion 260 which in turn is connected to a hub 262. This hub is internally splined at 265 to the shaft 166.

Sun gear 254 is keyed or splined to a brake element 264. Element 264 in turn carries at its periphery an internally splined brake disc 266. It is connected also by means of a keyed connection to an overrunning brake outer race 268. The inner race 270 for the overrunning brake is splined at 272 to a sleeve shaft 274 which in turn is journalled by means of bushings 276 and 280 to a second sleeve shaft 282. The second sleeve shaft in turn is journalled by means of bushings 284 and 286 upon the central shaft 166.

The overrunning brake of which races 268 and 270 form a part is identified generally by reference character 288. It includes overrunning brake elements in the form of rollers or sprags 290. If rollers are used, race 268 can be cammed to permit camming action with the rollers. Brake 288 inhibits rotation of the sun gear 254 in one direction but permits free wheeling motion in the opposite direction.

Splined also to shaft 274 is a brake element 292 which carries an internally splined brake disc 294. A brake separator disc 296 is situated between the friction discs 266 and 294 and is splined to a brake ring 298 which in turn is keyed to brake drum 300 carried in a fixed fashion within the housing portion 16. Brake ring 298 is held axially fast by a snap ring 302. A thrust plate 304 also is carried by the ring 298. A pressure plate 306 is situated adjacent plate 294. It is adapted to be urged into frictional engagement with disc 294 by a valve spring actuator 308. This actuator is pivoted at its outer periphery 310 to the drum 300. Its inner periphery engages an intermediate portion of a brake actuator piston 312. This piston is situated within an annular cylinder 314 formed in the brake drum 300. Cylinder 314 and piston 312 cooperate to define a pressure cavity which may be pressurized through suitable internal passage structure, not shown. This passage structure may form a part of the automatic control valve circuit.

A thrust washer 316 is situated between brake drum 300 and brake element 292. Another thrust washer 318 is situated between sun gear 254 and inner overrunning brake race 270.

Thrust washers 320 and 322 are situated on either side of the radial portion 260 for the shaft 262. Another thrust washer 324 is situated between carrier 248 and the sun gear 254. Still another thrust washer 326 is situated between portion 220 of the carrier and the stationary cover plate 70.

The planetary gear unit 246 includes a sun gear 328 and a ring gear 330. These gears are engaged by planet pinions 332 which are journalled upon pinion shafts 334. These shafts in turn are supported by carrier 336. Carrier 336 is keyed at 338 to a clutch drum 340 which in turn is connected integrally to the power output shaft 12.

Clutch drum 40 defines an annular cylinder 342 within which is positioned an annular piston 344. The drum 340 is formed with longitudinally extending slots within which is received a clutch disc element 346. This element carries a clutch disc 348 which is secured thereto at its outer periphery. Secured also to the element 346 at its outer periphery is a reaction disc 350 which is held axially fast with respect to the drum 340 by means of a snap ring 352. A clutch pressure plate is secured to the element 346 at its outer periphery and is inhibited from relative rotation although it is capable of moving axially. This pressure plate is shown at 353.

Situated between disc 348 and pressure plate 353 is a friction disc 354. A corresponding disc shown at 356 is disposed between reaction plate 350 and disc 348. Discs 356 and 354 are internally splined to an externally splined clutch element 358. This element in turn is splined at its hub to the shaft 166.

The pressure plate 352 is actuated by a Belleville actuator spring 360 which is anchored at its outer periphery to the drum 340. The inner periphery of disc 360 engages an intermediate portion of piston 344. When the pressure chamber defined by the piston 344 and cylinder 342 is pressurized, a frictional driving connection is established between drum 340 and the shaft 166.

Ring gear 330 is supported by an element 362 which in turn is splined at 364 to shaft 282. Thrust washers are situated at either side of the element 362 as indicated. A thrust washer is disposed also between carrier 336 and the sun gear 328.

Sun gear 328 is formed with an extension 365 which forms an inner race for an overrunning brake assembly 366. This assembly includes an outer race 368 and overrunning brake elements 370 disposed between the races. These overrunning brake elements which can be sprags or rollers, establish a locking action between the races to inhibit relative rotation in one direction although freewheeling motion in the opposite direction is permitted.

Race 368 carries a pair of brake discs 372. These are situated on either side of a brake disc 374 which in turn is externally splined to an internally splined brake element 376. This element is situated within axial slotted openings formed in the drum 300. A reaction disc 378 also is carried by the element 376 and is held axially fast with respect to the drum 300 by a snap ring 380. A brake pressure plate 382, which also forms a part of the brake assembly, is engaged by a Belleville spring actuator disc 384 which in turn is anchored at its outer periphery to the drum 300. The inner periphery of the disc 384 is engaged by an actuator piston 386 which is slidably received within an annular cylinder 388. The cylinder 388 and the piston 384 cooperate to define a pressure cavity that is in fluid communication with the contral valve system. A sun gear extension 364 is splined at 389 to the sleeve shaft 274. It is supported upon the hub of element 362 by a bushing 390. A thrust washer 392 is situated between the carrier 336 and the race 368 and another thrust washer 394 is disposed between extension 364 and the drum 300.

The end shaft 166 is formed with a reduced diameter as shown at 396. It is journalled by means of a bushing 398 within a cooperating opening formed in the power output shaft 12. Shaft 12 in turn is journalled by means of a bushing 400 within an opening formed in an end wall 402 for the transmission housing portion 14. Secured to the wall 402 is a pump housing 404 which defines a pump chamber 406 within which are situated positive displacement gear pump elements 408. The driving portion of the elements 408 is keyed or otherwise drivably connected to the power output shaft 12. Pump housing 404 is formed with a sleeve extension 410 which surrounds power output shaft 12 and cooperates therewith to define a fluid pressure distributor manifold. Communicating with this manifold is a rear clutch pressure feed passage 412 which is in fluid communication with the cylinder 342. This manifold also forms a part of the control valve system.

Connected drivably to the power output shaft 12 is a fluid pressure governor 414 which is capable of establishing a pressure signal that is an indicator of the driven speed of the shaft 12. This signal is utilized by the automatic control valve system to control speed ratio changes.

To establish low speed ratio operation, the baffle 136 is shifted in a left hand direction. Turbine torque then is developed by the turbine 182 and distributed to the turbine shaft 166. The multiple disc brake, shown in part at 372 and 374, is engaged. Turbine torque in the shaft 166 is distributed to the ring gear 252 for the forward planetary gear unit 244. Sun gear 254 acts as a reaction member and reaction torque is delivered through overrunning coupling 288 to the shaft 274. Shaft in turn is anchored by means of the overrunning brake 366. Reaction torque then is distributed through overrunning brake 366 to the transmission housing through the applied brake disc assembly 372 and 374.

The output torque of the carrier 248 is distributed to the ring gear 330 and multiplied again by the rear planetary gear unit. The reaction torque for the rear planetary gear unit is distributed from the sun gear 328 and through the overrunning brake and the applied friction disc assembly 372 and 374 to the transmission housing.

To establish a speed ratio change to the intermediate speed ratio, it merely is necessary to shift the baffle 136 in a right hand direction thereby activating the turbine 120. Turbine 182 becomes inoperative. Turbine torque then is delivered through sleeve shaft 160 to the carrier for the front planetary gear unit and hence to the shaft 282. The driving torque of turbine 120 then is distributed to ring gear 330. Sun gear 328 acts as a reaction member and the carrier 336 acts as a driven member. The reaction torque is distributed to the housing through the overrunning brake 366 and the applied friction brake 372 and 374. The carrier, of course, is connected directly to the power output shaft.

To establish high speed ratio operation, it merely is necessary to release the multiple disc brake 372 and 374 and apply the multiple disc clutch shown in part at 348 and 354. It is necessary also to shift the baffle 136 in a left hand direction thereby rendering the turbine 182 operable while the turbine 120 is rendered inoperative. Turbine torque then is delivered directly to the shaft 166 and hence to the power output shaft through the engaged multiple disc clutch.

Reverse drive operation is obtained by shifting the baffle 136 in a left hand direction and then engaging the cone brake shown in part at 226 and 228. This anchors the carrier for the front planetary gear unit. Turbine torque then is delivered directly to the ring gear 252. Since the carrier is anchored, the sun gear 254 is driven in a reverse direction. This reverse motion is transmitted to the overrunning coupling 288 to the shaft 274. This drives sun gear 328 in reverse direction. Ring gear 330 is anchored also by the cone brake 226 and 228. The carrier 336 then is driven in a reverse direction and this of course powers the power output shaft 12 in reverse direction.

During a speed ratio change from a low speed ratio to the high speed ratio, the overrunning coupling 288 freewheels thereby permitting a nonsynchronous ratio shift. During a speed ratio change from an intermediate ratio to the high speed ratio, the overrunning brake 366 freewheels which permits a nonsynchronous action during this ratio shift. To establish coasting in any of the three forward driving speed ratios, it merely is necessary to engage the multiple disc brake assembly shown in part at 294 and 296. This by-passes the coupling 290 and the overrunning brake 366 so that the sun gears are capable of functioning as reaction members.

Figure 4:
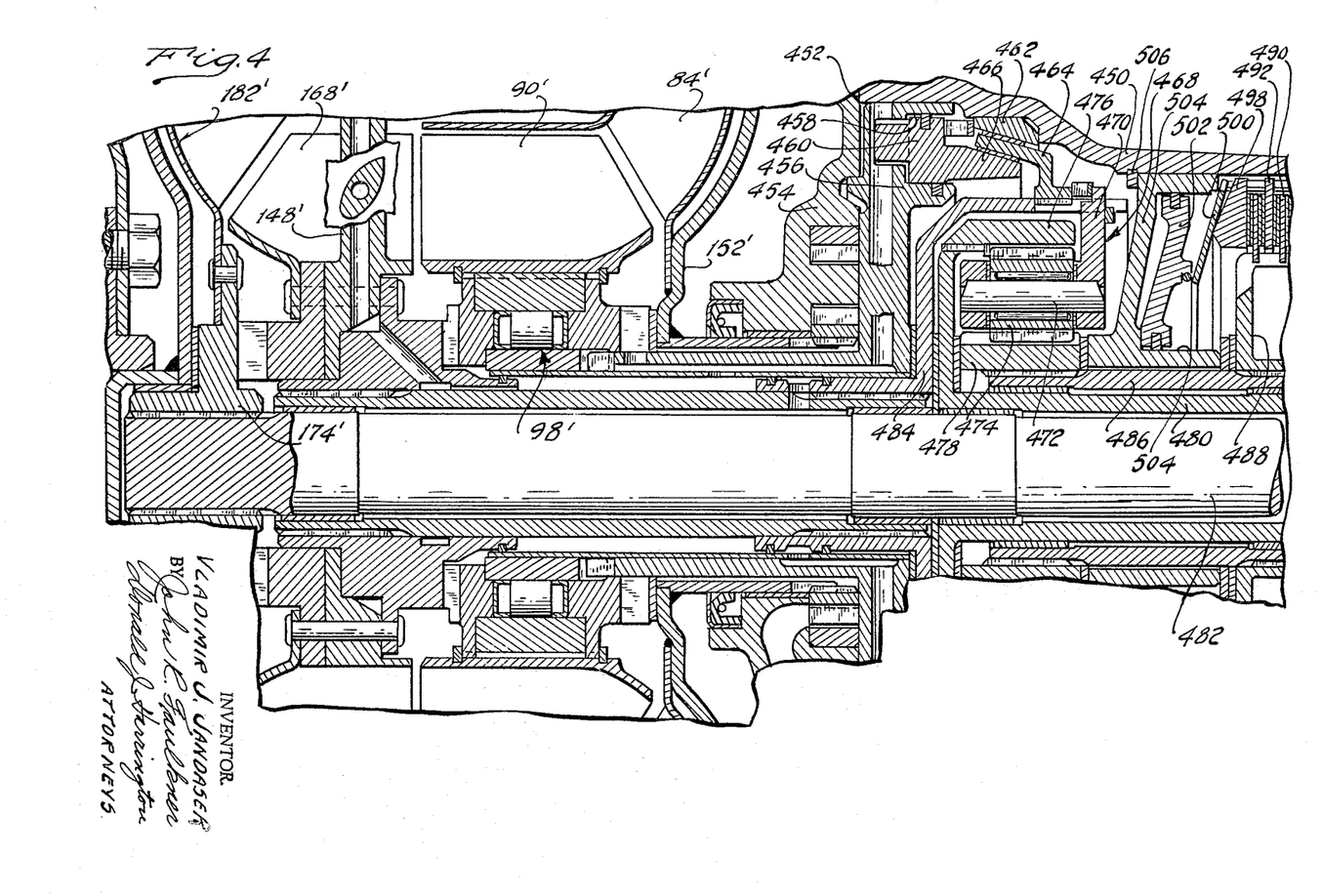
FIGURES 4 and 5 show cross sectional views of an alternate gear arrangement wherein the speed ratio changes are accomplished by selectively controlling friction clutch and brake devices.
Figures 5, 6:
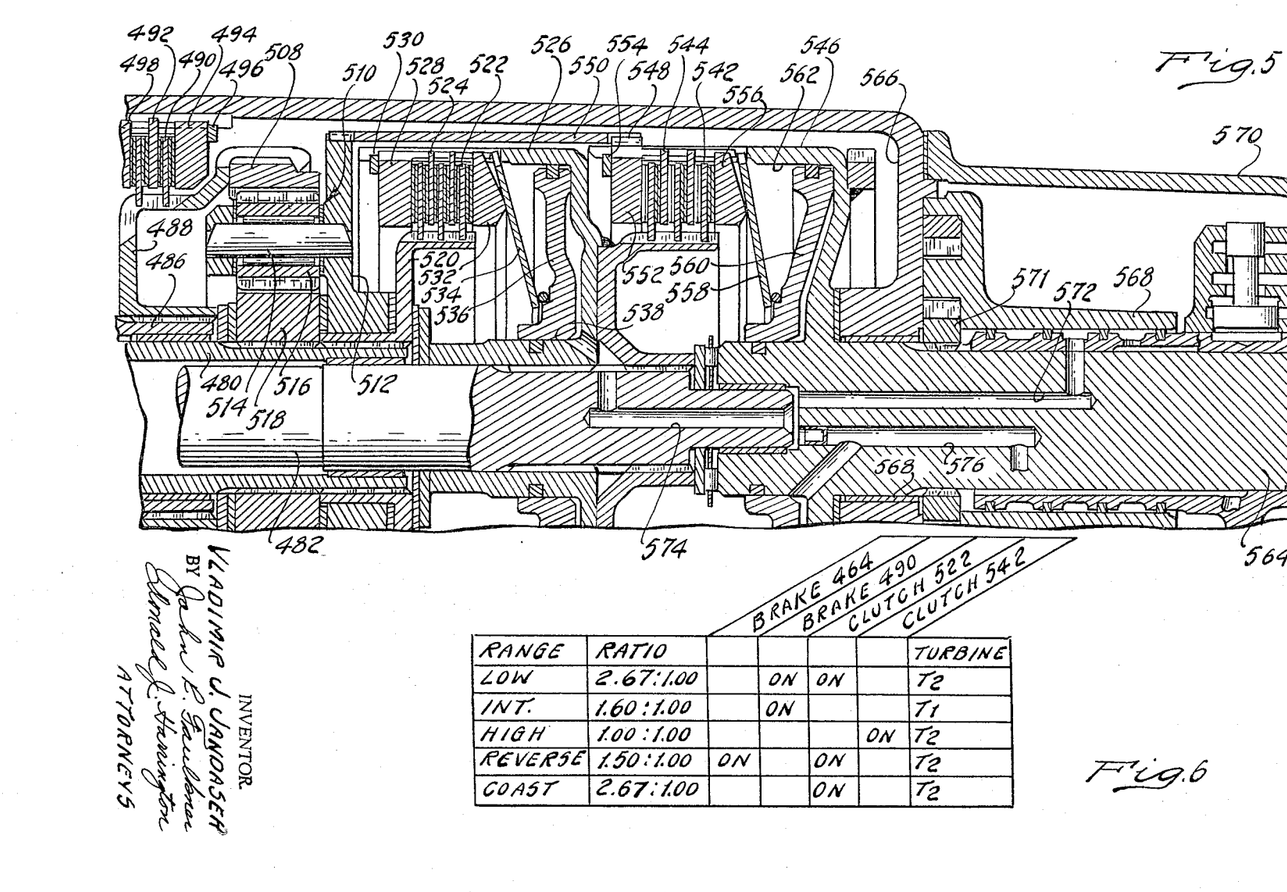
FIGURE 6 is a chart showing the speed ratio change pattern for the mechanism of FIGURES 4 and 5.

Referring next to FIGURES 4 and 5, I have shown an alternate gear arrangement which may be employed with a hydrokinetic unit of the type shown in FIGURE 1. The portions of this embodiment that have counterpart elements in the embodiment of FIGURES 1 and 2 have been designated by similar reference characters, although prime notations have been added. This gear arrangement is disposed within a housing portion 450. Secured to a shoulder 452 of the housing portion 450 is a separator wall 454 which separates the hydrokinetic portion of the mechanism from the geared portion. Cooperating with the wall 450 is a cover plate 456 which is secured to the wall 454 by bolts (not shown).

Plate 456 defines an annular cylinder 458 within which is situated an annular piston 460. This piston and cylinder cooperate to define a pressure chamber that may be pressurized through suitable internal passage structure formed in part in the plate 454.

A brake ring 462 is carried within the inner surface of the housing portion 450. Situated adjacent the element 462, is a cone brake element 464. Situated on the underside of the element 464 is a cone brake element 466 which forms an extension of the piston 460. As the piston 460 is urged in a right hand direction as viewed in the drawings, brake element 464 becomes anchored to the housing portion 450.

A front planetary gear unit is shown at 468. It includes a carrier 470 which supports planet pinion shafts 472. Planet pinion gears 474 are journaled upon shafts 472 and engage a ring gear 476 and a sun gear 478. Ring gear 476 in turn is drivably connected to a sleeve shaft 480 which surrounds a central turbine shaft 482. Turbine shaft 482 may be connected to a turbine member corresponding to the turbine 182 of FIGURE 1. Carrier 470, on the other hand, can be connected to a turbine member corresponding to turbine 120 of the embodiment of FIGURE 1 by means of a torque transfer member 484.

Sun gear 478 is splined to an intermediate sleeve shaft 486 which in turn is splined to a brake element 488. This brake element carries friction brake discs 490 situated on either side of a stationary brake disc 492. A brake disc reaction member 494 is connected to the housing and is held axially fast by a snap ring 496. A brake pressure plate 498 applies braking pressure to the discs as it is engaged by an actuator Belleville spring disc 500. This spring disc is anchored at its outer periphery to the housing and is engaged at its inner periphery by a brake operating piston 502 which is slidably received within a brake cylinder 504. This cylinder is defined by a brake drum 503 that is secured in a fixed fashion to the interior of the housing 450. It is held axially fast within the housing by means of a snap ring 506.

Brake element 488 is fixed to ring gear 508 of a rear planetary gear unit 510. This gear unit includes also a carrier 512 which supports planet pinion shafts 514 upon which are journaled planet pinion gears 516. The gears 516 drivably engages ring gear 508 and also sun gear 518 which in splined to the shaft 480. Clutch element 520 carries clutch discs 522 situated in interdigital relationship with respect to externally splined clutch discs 524 carried by clutch drum 526. A clutch pressure reaction disc 528 is carried by the drum 526 and is held axially fast thereon by snap ring 530. The clutch pressure plate 532 also is carried by the drum 526 and is engaged by a Belleville type actuator spring 534. This spring is pivoted at its outer periphery upon the drum 526 and is engaged at its inner periphery by a clutch actuator piston 536. This piston is slidably received within an annular cylinder 538 defined by the drum 526. Drum 526 is splined in driving relationship to the shaft 482.

The clutch element 540 is secured to drum 526 and also is splined to shaft 482. It carries internally splined clutch discs 542 which are situated in interdigital relationship with respect to externally splined discs 544 carried by a clutch drum 546. Drum 546 is keyed at 548 to a torque transfer member in the form of a drum 550. This drum 550 in turn is keyed to the carrier 512.

A cultch reaction disc 552 is carried by the drum 546 and is held axially fast by a snap ring 554. A clutch pressure plate is shown at 556. It is adapted to apply pressure to the friction discs 542 and 544 as it is engaged by actuator spring 558, the latter being pivoted at its outer periphery to the drum 546 and engaged at its inner periphery by a clutch actuator piston 560. This piston is situated slidably within an annular cylinder 562 formed in drum 546. Drum 546 in turn is connected directly to power output shaft 564.

The housing portion 450 is formed with an end wall 566 having a central opening 568 through which the shaft 564 is received.

A tailshaft extension housing 570 can be secured to the end of the housing portion 450 to enclose the shaft 564.

Secured also to the wall 566 is a pump housing 568 which defines a pump chamber for pump elements 570. The driving portion of the elements 570 is keyed to the shaft 564. Housing 568 defines also a sleeve type fluid pressure manifold which defines in part a pressure distributor passage 572. This passage communicates with a passage 574 formed in shaft 482 which in turn communicates directly with the cylinder 538 for actuating the clutch disc assembly 522 and 524.

The manifold and the shaft 564 define also another passage 576 which communicates directly with the cylinder 562 for actuating clutch disc assembly shown in part in 542 and 544.

To establish low speed ratio operation, the turbine corresponding to turbine 182 of FIGURE 1 is rendered operable. Turbine torque is then distributed directly to shaft 482. The multiple disc brake assembly 492 and 494 is applied, thereby anchoring the ring gear 508 and the sun gear 478. The multiple disc clutch assembly 522 and 524 is applied. Turbine torque then is distributed directly to the sun gear 518 and the carrier 512 is driven. This then causes the drum 546 and the power output shaft 564 to be driven.

To establish intermediate speed ratio operation, multiple disc clutch assembly 522 and 524 is disengaged. The turbine corresponding to turbine 120 is rendered operable by shifting the flow directing baffle of the hydrokinetic unit. Torque is then distributed to the carrier for the front planetary gear unit 468. Since the sun gear 478 is anchored by the engaged multiple disc brake 492 and 490, the ring gear 476 is over-driven. The ring gear torque then is transferred to sun gear 518 of the second planetary gear unit 510. Ring gear 508 acts as a reaction member since it is anchored by the engaged brake disc assembly 490 and 492. The carrier 512 is then driven at a reduced speed ratio and this, of course, causes the power output shaft 564 to be driven at the same ratio.

To establish direct drive operation, the flow directing baffle of the hydrokinetic unit is shifted again to render operable the turbine corresponding to the turbine 182 of FIGURE 1A. Turbine torque then is distributed directly through the multiple clutch disc assembly 542 and 544 which is engaged to obtain a speed ratio shift to the high speed ratio. This then establishes a direct connection between the driving turbine and the power output shaft 564.

Reverse drive operation is obtained by engaging the cone brake shown in part at 462 and 464. Also the turbine corresponding to the turbine 182 of FIGURE 1 is rendered operable. The clutch disc assembly 522 and 524 is engaged. Turbine torque then is distributed directly to the sun gear 518 and to the ring gear 476. The carrier 470 remains stationary and the sun gear 478 then is driven in reverse direction. Reverse motion then is imparted to the ring gear 508 and this reverse motion and the forward motion of the sun gear 518 result in a reverse motion of the carrier 512. The reverse motion of the carrier, of course, is transferred to the power output shaft 564.

To establish coasting operation, both the multiple disc brake assembly 492 and 494 and the multiple disc clutch assembly 522 and 524 are engaged. The mechanism then is conditioned for torque delivery in a reverse direction. The turbine corresponding to the turbine 182 of FIGURE 1 is rendered operable during coasting operation.

Having thus described preferred embodiments of my invention, what I claim and desire to secure by United States Letters Patent is:

1. In a power transmission mechanism, a hydrokinetic unit comprising an impeller and a pair of turbines, each turbine comprising a portion of a separate torus circuit, said impeller being common to each torus circuit, a first turbine shaft drivably connected to a first turbine, a second turbine shaft drivably connected to the second turbine, a flow directing baffle defining a portion of each circuit, and adapted to assume either one of two axial positions, said baffle directing flow from the exit region of said impeller through one turbine when it assumes one position and through the other turbine when it assumes the other position, and servo means carried by said other turbine and disposed within the inner torus region of said circuits for actuating said baffle from one position to the other to render said turbines selectively operable for torque delivery.

2. In a power transmission mechanism, a hydrokinetic unit comprising an impeller and a pair of turbines, each turbine comprising a portion of a separate torus circuit, said impeller being common to each torus circuit, a first turbine shaft drivably connected to a first turbine, a second turbine shaft drivably connected to the second turbine, a flow directing baffle defining a portion of each circuit and adapted to assume either one of two axial positions, said baffle directing flow from the exit region of said impeller through one turbine when it assumes one position and through the other turbine when it assumes the other position, servo means carried by said other turbine and disposed within the inner torus region of said circuits for actuating said baffle from one position to the other to render said turbines selectively operable for torque delivery, a multiple speed ratio gear assembly comprising torque delivery elements including a power output element and a pair of power input elements, and means for anchoring one of the elements to provide a torque reaction path to a stationary portion of said mechanism, one turbine being connected to one input element and the other turbine being connected to the other input element whereby speed ratio changes can be accomplished by actuating said baffle from one position to the other.

3. A power transmission mechanism comprising a hydrokinetic unit having a pair of turbines and a common impeller, said impeller and one turbine defining one torus flow circuit, the other turbine and said impeller defining a separate torus flow circuit, a flow directing baffle means having portions situated within the inner region of each torus circuit for directing the flow at the exit region of said impeller selectively to each turbine entrance region, said baffle means being capable of assuming either one of two positions and adapted to direct flow through a first of said turbines when it assumes one position and through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, brake means for anchoring the sun gear of the second gear unit and the sun gear of the first gear unit, the carrier of the first gear unit being connected to one turbine and the ring gear of the first gear unit being connected to the other turbine, and selectively operable clutch means for connecting directly the other turbine to said driven member.

4. A power transmission mechanism comprising a hydrokinetic unit having a pair of turbines and a common impeller, said impeller and one turbine defining one torus flow circuit, the other turbine and said impeller defining a separate torus flow circuit, a flow directing baffle means having portions situated within the inner region of each torus circuit for directing the flow at the exit region of said impellor selectively to each turbine entrance region, said baffle means being capable of assuming either one of two positions, said baffle means being adapted to direct flow through a first of said turbines with its assumes one position and through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear unit being connected to the other turbine, selectively operable clutch means for connecting directly the other turbine to said driven member, and brake means for anchoring said sun gears comprising a separate overrunning brake element for each sun gear and a common selectively engageable friction brake means, each overrunning brake element forming a part of a torque delivery path between its respective sun gear and said friction brake means.

5. A power transmission mechanism comprising a hydrokinetic unit having a pair of turbines and a common impeller, said impeller and one turbine defining one torus flow circuit, the other turbine and said impeller defining a separate torus flow circuit, a flow directing baffle means having portions situated within the inner region of each torus circuit for directing the flow at the exit region of said impeller selectively to each turbine entrance region, said baffle means being capable of assuming either one of two positions, said baffle means being adapted to direct flow through a first of said turbines when it assumes one position and through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear unit being connected to the other turbine, selectively operable clutch means for connecting directly the other turbine to said driven member, brake means for anchoring said sun gears comprising a separate overrunning brake element for each sun gear and a common selectively engageable friction brake means, each overrunning brake element forming a part of a torque delivery path between its respective sun gear and said brake means, and coast brake means for by-passing said overrunning brake elements whereby said sun gears may be connected directly to a stationary portion of said mechanism selectively to condition said mechanism for coast braking.

6. A power transmission mechanism comprising a hydrokinetic unit having a pair of turbines and a common impeller, said impeller and one turbine defining one torus flow circuit, the other turbine and said impeller defining a separate torus flow circuit, a flow directing baffle means having portions situated within the inner region of each torus for directing the flow at the exit region of said impeller selectively to each turbine entrance region, said baffle means being capable of assuming either one of two positions and adapted to direct flow through a first of said turbines when it assumes one position and through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear unit being connected to the other turbine, selectively operable clutch means for connecting directly the other turbine to said driven member, brake means for anchoring said sun gears comprising a separate overrunning brake element for each sun gear and a common selectively engageable friction brake means, each first overrunning brake element forming a part of a torque delivery path between its respective sun gear and said brake means, and second selectively operable friction brake means for anchoring the carrier of said first gear unit.

7. A power transmission mechanism comprising a hydrokinetic unit having a pair of turbines and a common impeller, said impeller and one turbine defining one torus flow circuit, the other turbine and said impeller defining a separate torus flow circuit, a flow directing baffle means having portions situated within the inner region of each torus for directing the flow at the exit region of said impeller selectively to each turbine entrance region, said baffle means being capable of assuming either one of two positions and adapted to direct flow through a first of said turbines when it assumes one position and through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear unit being connected to the other turbine, selectively operable clutch means for connecting directly the other turbine to said driven member, brake means for anchoring said sun gears comprising a separate overrunning brake element for each sun gear and a common selectively engageable friction brake means, each overrunning brake element forming a part of a torque delivery path between its respective sun gear and said brake means, and coast brake means for by-passing said overrunning brake elements whereby said sun gears may be connected directly to a stationary portion of said mechanism selectively to condition said mechanism for coast braking, and second selectively operable friction brake means for anchoring the carrier of said first gear unit.

8. A power transmission mechanism comprising a hydrokinetic unit having a pair of turbine members situated in separate torus circuits, an impeller situated in each circuit, flow directing baffle means shiftable from one position to the other for selectively distributing the flow at the exit region of said impeller to each turbine, said baffle being adapted to direct flow to the entrance region of one turbine when it assumes one position and to the entrance region of the other turbine when it assumes the other position, fluid pressure operated servo means situated within the inner torus region of said circuits for actuating said baffle means so that it will assume one position or the other whereby said turbines are rendered selectively operable, a pair of simple planetary gear units, each unit comprising a sun gear, a ring gear, a carrier, and planet gears rotatably journaled upon said carrier in meshing engagement with said sun and ring gears, the sun gear of the first unit being connected to the ring gear of the second unit, selectively engageable brake means for anchoring the ring gear of said second unit, means for connecting the carrier of said second unit to a driven member, means including a selectively engageable clutch for connecting one turbine to the sun gear of said second gear unit, a turbine shaft interconnecting the second turbine with the carrier of said first gear unit, and selectively engageable clutch means for connecting the first turbine directly to said driven member.

9. A power transmission mechanism comprising a hydrokinetic unit having a pair of turbine members situated in separate torus circuits, an impeller situated in each circuit, flow directing baffle means shiftable from one position to the other for selectively distributing the flow at the exit region of said impeller to each turbine, said baffle being adapted to direct flow to the entrance region of one turbine when it assumes one position and to the entrance region of the other turbine when it assumes the other position, fluid pressure operated servo means situated within the inner torus region of said circuit for actuating said baffle means so that it will assume one position or the other whereby said turbines are rendered selectively operable, a pair of simple planetary gear units, each unit comprising a sun gear, a ring gear, a carrier, and planet gears rotatably journaled upon said carrier in meshing engagement with said sun and ring gears, the sun gear of the first unit being connected to the ring gear of the second unit, selectively engageable brake means for anchoring the ring gear of said second unit, means for connecting the carrier of said second unit to a driven member, means including a selectively engageable clutch for connecting the first turbine to the sun gear of said second gear unit, a turbine shaft interconnecting the second turbine with the carrier of said first gear unit, selectively engageable clutch means for connecting the first turbine directly to said driven member, and selectively engageable reverse brake means for anchoring the carrier of said first gear unit.

10. In a power transmission mechanism, a hydrokinetic torque convertor unit comprising an impeller and a pair of turbines, each turbine comprising a portion of a separate torus circuit, said impeller being common to each torus circuit, a first turbine shaft drivably connected to a first turbine, a second turbine shaft drivably connected to the second turbine, a flow directing baffle defining a portion of each circuit and adapted to assume either one of two axial positions, said baffle directing flow from the exit region of said impeller through one turbine when it assumes one position and through the other turbine when it assumes the other position, and servo means carried by said other turbine and disposed within the inner torus region of said circuits for actuating said baffle from one position to the other to render said turbines selectively operable for torque delivery, said hydrokinetic unit including also a bladed stator situated at the flow entrance region of said impeller whereby the tangential component of the fluid flow received from the exit region of each turbine is changed prior to its entry into the impeller.

11. In a power transmission mechanism, a hydrokinetic torque convertor unit comprising an impeller and a pair of turbines, each turbine comprising a portion of a separate torus circuit, said impeller being common to each torus circuit, a first turbine shaft drivably connected to a first turbine, a second turbine shaft drivably connected to the second turbine, a flow directing baffle defining a portion of each circuit and adapted to assume either one of two axial positions, said baffle directing flow from the exit region of said impeller through one turbine when it assumes one position and through the other turbine when it assumes the other position, servo means carried by said other turbine and disposed within the inner torus region of said circuits for actuating said baffle from one position to the other to render said turbines selectively operable for torque delivery, a multiple speed ratio gear assembly comprising torque delivery elements including a power output element and a pair of power input elements, and means for anchoring one of the gear elements to provide a torque reaction path to a stationary portion of said mechanism, one turbine being connected to one input element and the other turbine being connected to the other input element whereby speed ratio changes can be accomplished by actuating said baffle from one position to the other, said hydrokinetic unit including also a bladed stator situated at the flow entrance region of said impeller whereby the fluid flow received from the exit region of each turbine is changed in direction prior to entry into impeller.

12. A power transmission mechanism comprising a hydrokinetric torque converter unit having a pair of turbines and a common impeller, said impeller and one turbine defining one torus flow circuit, the other turbine and said impeller defining a separate torus flow circuit, a flow directing baffle means having portions situated within the inner region of each torus circuit for directing the flow at the exit region of said impeller selectively to each turbine entrance region said baffle means being capable of assuming either one of two positions and adapted to direct flow throughout a first of said turbines when it assumes one position and through the other of said turbines when it assumes the other position, servo means including relatively movable pressure operated parts located within the inner torus region of said circuits for moving said baffle means from one position to the other whereby said turbines are rendered selectively operable, a pair of simple planetary gear units each gear unit comprising a ring gear, a sun gear, a carrier and planet gears rotatably journaled upon said carrier in meshing engagement with said sun and ring gears, the carrier of a first of said units being connected to the ring of a second of said units, the carrier of the second gear unit being connected to a driven member, brake means for anchoring the sun gear of the second gear unit and the sun gear of the first gear unit, the carrier of the first gear unit being connected to one turbine and the ring gear of the first gear unit being connected to the other turbine, and selectively operable clutch means for connecting directly the other turbine to said driven member, said hydrokinetic unit including also a bladed stator situated at the flow entrance region of said impeller whereby the fluid flow received from the exit region of each turbine is changed in direction prior to its entry into the impeller.

13. A power transmission mechanism comprising a hydrokinetic torque convertor unit having a pair of turbines and a common impeller, said impeller and one turbine defining one torus flow circuit, the other turbine and said impeller defining a separate torus flow circuit, a flow directing baffle means having portions situated within the inner region of each torus circuit for directing the flow at the exit region of said impeller selectively to each turbine entrance region, said baffle means being capable of assuming either one of two positions, said baffle means being adapted to direct flow through a first of said turbines when it assumes one position and through the other of said turbines when it assumes the other position, servo means including relatively movable pressure operated parts located within the inner torus region of said circuits for moving said baffle from one position to the other where by said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear being connected to the other turbine, and selectively operable clutch means for connecting directly the other turbine to said driven member, and brake means for anchoring said sun gears comprising a separate overrunning brake element for each sun gear and a common selectively engageable friction brake means, each overrrunning brake element forming a part of a torque delivery path between its respective sun gear and said friction brake means, said hydrokinetic unit including also a bladed stator situated at the flow entrance region of said impeller whereby the fluid flow received from the exit region of each turbine is changed in direction prior to its entry into the impeller.

14. A power transmission mechanism comprising a hydrokinetic torque convertor unit having a pair of turbines and a common impeller, said impeller, and one turbine defining one torus flow circuit, the other turbine and said impeller defining a separate torus flow circuit, a flow directing baffle means having portions situated within the inner region of each torus circuit for directing the flow at the exit region of said impeller selectively to each turbine entrance region, said baffle means being capable of assuming either one of two positions, said baffle means being adapted through a first of said turbines when it assumes one position and to direct flow through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear unit being connected to the other turbine, selectively operable clutch means for connecting directly the other turbine to said driven member, brake means for anchoring said sun gears comprising a separate overrunning brake element for each sun gear and a common selectively engageable friction brakes means, and coast brake means for by-passing said overrunning brake elements whereby said sun gears may be connected directly to a stationary portion of said mechanism selectively to condition said mechanism for coast braking, said hydrokinetic unit including a bladed stator situated at the flow entrance region of said impeller whereby the fluid flow received from the exit region of each turbine is changed in direction prior to its entry into the impeller.

15. A power transmission mechanism comprising a hydroknetic torque convertor unit having a pair of turbines and a common impeller, said impeller and one turbine defining one torus flow circuit, the other turbine and said impeller defining a separate torus flow circuit, a flow directing baffle means having portions situated within the inner region of each torus for directing the flow at the exit region of said impeller selectively to each turbine entrance region, said baffle means being capable of assuming either one of two positions, said baffle means being adapted to direct flow through a first of said turbines when it assumes one position through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear being connected to the other turbine, and selectively operable clutch means for connecting directly the other turbine to said driven member, brake means for anchoring said sun gears comprising a separate overrunning brake element for each sun gear and a common selectively engageable friction brake means, each overrunning brake element forming a part of a torque delivery path between its respective sun gear and said brake means, and second selectively operable friction brake means for anchoring the carrier of said first gear unit, said hydrokinetic unit including also a bladed stator situated at the flow entrance region of said impeller whereby the fluid flow received from the exit region of each turbine is changed in direction prior to its entry into the impeller.

16. A power transmission mechanism comprising a hydrokinetic torque convertor unit having a pair of turbines and a common impeller, said impeller and one turbine defining one torus flow circuit, the other turbine and said impeller defining a separate torus flow circuit, a flow directing baffle means having portions situated within the inner region of each torus for directing the flow at the exit region of said impeller selectively to each turbine entrance region, said baffle means being capable of assuming either one of two positions, and adapted to direct flow through a first of said turbines when it assumes one position and to direct flow through the other of said turbines when it assumes the other position, servo means including relatively movable pressure operated parts located within the inner torus region of said circuits for moving said baffle means from one position to the other whereby said turbines are rendered selectively operable, a pair of simple planetary gear units, each gear unit comprising a ring gear, a sun gear, a carrier and planet gears rotatably journaled upon said carrier in meshing engagement with said sun and ring gears, the carrier of a first of said units being connected to the ring gear of a second of said units, the carrier of the second gear unit being connected to a driven member, the carrier of the first gear unit being connected to one turbine and the ring gear of the first gear unit being connected to the other turbine, selectively operable clutch means for connecting directly the other turbine to said driven member, brake means for anchoring said sun gears comprising a separate overrunning brake element for each sun gear and a common selectively engageable friction brake means, and overrunning brake element forming a part of a torque delivery path between its respective sun gear and said brake means, coast brake means for by-passing said overrunning brake elements whereby said sun gears may be connected directly to a stationary portion of said mechanism selectively to condition said mechanism for coast braking, and second selectively operable friction brake means for anchoring the carrier of said first gear unit, said hydrokinetic unit including also a bladed stator situated at the flow entrance region of said impeller whereby the fluid flow received from the exit region of each turbine is changed in direction prior to its entry into the impeller.

17. A power transmission mechanism comprising a hydrokinetic unit having a pair of turbine members situated in separate torus circuits, an impeller situated in each circuit, flow directing baffle means shiftable from one position to the other for selectively distributing the flow at the exit region of said impeller to each turbine, said baffle being adapted to direct flow to the entrance region of one turbine when it assumes one position and to the entrance region of the other turbine when it assumes the other position, fluid pressure operated servo means situated within the inner torus region of said circuits for actuating said baffle means so that it will assume one position or the other whereby said turbines are rendered selectively operable, a pair of simple planetary gear units, each unit comprising a sun gear, a ring gear, a carrier, and planet gears rotatably journaled upon said carrier in meshing engagement with said sun and ring gears, the sun gear of the first unit being connected to the ring gear of the second unit, selectively engageable brake means for anchoring the ring gear of said second unit, means for connecting the carrier of said unit to a driven member, means including a selectively engageable clutch for connecting one turbine to the sun gear of said second gear unit, a turbine shaft interconnecting the second turbine with the carrier of said first gear unit, and selectively engageable clutch means for connecting the first turbine directly to said driven member, said hydrokinetic unit including also a bladed stator situated at the flow entrance region of said impeller whereby the fluid flow received from the exit region of each turbine is changed in direction prior to its entry into the impeller.

18. A power transmission mechanism comprising a hydrokinetic unit having a pair of turbine members situated in separate torus circuits, an impeller situated in each circuit, flow directing baffle means shiftable from one position to the other for selectively distributing the flow at the exit region of said impeller to each turbine, said baffle being adapted to direct flow to the entrance region of one turbine when it assumes one position and to the entrance region of the other turbine when it assumes the other position, fluid pressure operated servo means situated within the inner torus region of said circuit for actuating said baffle means so that it will assume one position or the other whereby said turbines are rendered selectively operable, a pair of simple planetary gear units, each unit comprising a sun gear, a ring gear, a carrier, and planet gears rotatably journaled upon said carrier in meshing engagement with said sun and ring gears, the sun gear of the first unit being connected to the ring gear of the second unit, selectively engageable brake means for anchoring the ring gear of said second unit, means for connecting the carrier of said unit to a driven member, means including a selectively engageable clutch for connecting the first turbine to the sun gear of said second gear unit, said sun gear being connected to the ring gear of said second gear unit, a turbine shaft interconnecting the second turbine with the carrier of said first gear unit, and selectively engageable reverse brake means for anchoring the carrier of said first gear unit, said hydrokinetic unit including also a bladed stator situated at the forward entrance region of said impeller whereby the fluid flow received from the exit region of each turbine is changed in direction prior to its entry into the impeller.

References Cited by the Examiner
UNITED STATES PATENTS

| | | | |
|---|---|---|---|
| 2,658,346 | 11/1953 | Seybold | 60—54 |
| 2,813,437 | 11/1957 | Kelbel et al. | 74—759 |
| 2,829,542 | 4/1958 | Swennes | 74—688 |
| 2,856,794 | 9/1958 | Simpson | 74—763 |
| 3,150,541 | 9/1964 | Flinn | 74—677 |

DAVID J. WILLIAMOWSKY, *Primary Examiner.*

J. R. BENEFIEL, *Assistant Examiner.*